No. 854,463. PATENTED MAY 21, 1907.
J. W. CARHART.
LAMINATED TIRE.
APPLICATION FILED MAY 23, 1906.
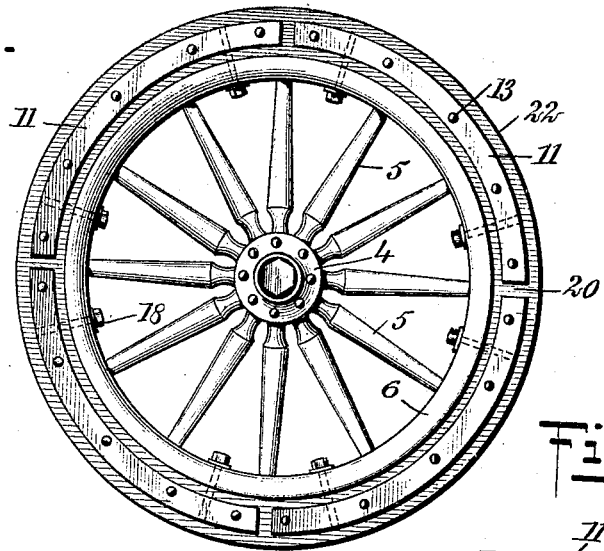
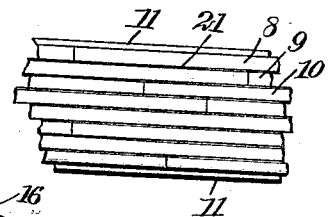
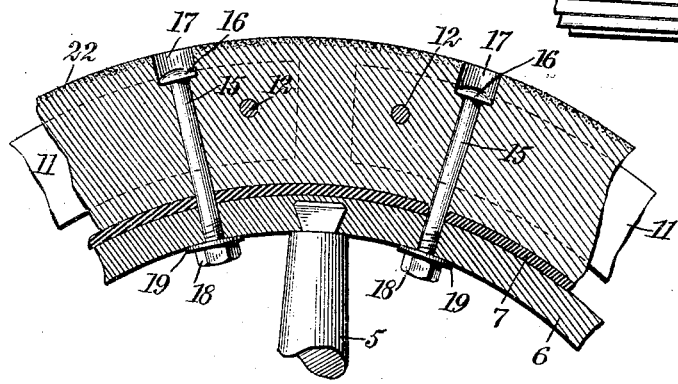
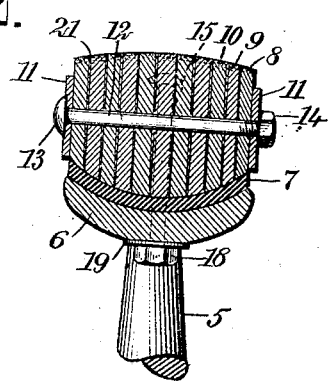
WITNESSES
INVENTOR
John W. Carhart
BY Munn & Co
ATTORNEYS

UNITED STATES PATENT OFFICE.

JOHN WESLEY CARHART, OF AUSTIN, TEXAS.

LAMINATED TIRE.

No. 854,463.  Specification of Letters Patent.  Patented May 21, 1907.

Application filed May 23, 1906. Serial No. 318,330.

*To all whom it may concern:*

Be it known that I, JOHN WESLEY CARHART, a citizen of the United States, and a resident of Austin, in the county of Travis and State of Texas, have invented a new and Improved Laminated Tire, of which the following is a full, clear, and exact description.

My invention relates to tires, such, for instance, as are used upon automobiles and other road vehicles; my more particular object being to produce a tire built up of laminæ so as to possess great strength and resiliency, and to be easily constructed of comparatively cheap materials as well as to be easily repaired, or to be replaced either in whole or in part.

Reference is to be had to the accompanying drawings forming a part of this specification, in which similar characters of reference indicate corresponding parts in all the figures.

Figure 1 is a side elevation of a wheel equipped with my improved tire; Fig. 2 is an enlarged fragmentary central section through the top of the wheel and the tire, the section being taken upon a line crossing the axis of revolution; Fig. 3 is an enlarged central section through the top of the wheel, but taken upon a plane crossing the general direction of the tire; and Fig. 4 is a fragmentary elevation of the tire body as seen from the outside and showing how the laminæ break joints with each other.

The hub is shown at 4 and is connected by spokes 5 with the felly 6. The latter is concave as indicated in cross section in Fig. 3. A band 7, of flexible or resilient material, preferably rubber, is fitted closely upon the felly 6 and serves as a cushion for the tire. A number of segments 8, 9 and 10 of slightly different widths, are so disposed as to break joints with each other as indicated in Fig. 4. These segments are made of paper, woven or knitted fabrics and are shaped by cutting, stamping, or the like. The tire is built up by bringing together a number of these segments, the latter being so arranged that they will break joints with each other. A number of sectors 11 of sheet metal are disposed upon opposite sides of the tire, these sectors not touching each other and being held directly against opposite edges of the tire as will be understood from Fig. 3. Bolts 12, each provided with a head 13 and with a revoluble nut 14, pass directly through the sectors 11 and through the various segments 8, 9 and 10, constituting the body of the tire. Radial bolts 15 are let into the tire from the outer periphery thereof. Each of these bolts 15 is provided with a head 16 and with a revoluble nut 18 and with a washer 19. Each head 16 is sunken into an aperture 17 so as not to protrude from the outer surface of the tire. The bolts pass through the band 7 and the felly 6 as indicated in Fig. 2.

The arrangement of the metallic sectors 11, out of contact with each other, or in other words separated by a space 20 as indicated in Fig. 1, confers upon the wheel a considerable amount of resilience and flexibility, thereby rendering the wheel less rigid and less liable to break when subjected to severe strain. Intermediate of the segments 8, 9 and 10 are layers 21 of plastic material, preferably white lead paint, which renders the interior of the tire comparatively impervious to water and also acts as a preservative of the said segments. The outer rim 22 of the tire makes impact directly with the surface of the road and thus fills with grit, whereby it is rendered non-slipping and non-skidding.

I do not limit myself to the use of any particular materials out of which the segments 8, 9 and 10 are constructed. Neither do I limit myself to the material of which the band 7 may be made. It will be seen from the above that the segments 8, 9 and 10 virtually constitute laminæ of substantially annular form, and it will also be seen that these laminæ are exceedingly strong, owing to the fact that the separate sectors break joint with each other.

Having thus described my invention, I claim as new and desire to secure by Letters Patent:—

1. In a tire, the combination of a felly provided with a concave outer surface, a band of resilient material encircling the felly and conforming to the concave surface, and a tire body built up of laminæ; said laminæ being placed with one edge directly abutting the band of resilient material, the other edge forming the tread of the tire, sectors of sheet metal arranged on each side of the tire, said sectors being spaced apart, cross-bolts traversing the laminæ and the sectors, and radial bolts traversing the tire, the band and the felly, said tire having depressions for receiving the heads of the bolts.

2. In a tire, the combination of a felly provided with a concave outer surface, a band of resilient material encircling the felly and conforming to said concave surface, a tire body built up of laminæ, said laminæ being placed with one edge directly abutting the band of resilient material, the other edge forming the tread of the tire, sectors of sheet metal arranged on each side of the tire, said sectors being spaced apart from each other, means for securing the sectors and laminæ together, and means for securing the tire and the band to the felly.

In testimony whereof I have signed my name to this specification in the presence of two subscribing witnesses.

JOHN WESLEY CARHART.

Witnesses:
 B. F. GAMBLE,
 L. G. BOMBARGER.